United States Patent [19]

Matsuura et al.

[11] Patent Number: 5,999,228
[45] Date of Patent: *Dec. 7, 1999

[54] METHOD OF OPERATING MENU, ELECTRONIC EQUIPMENT AND TELEVISION RECEIVER SET

[75] Inventors: Chifumi Matsuura, Tokyo; Haruko Kono, Kanagawa; Kazuya Shimomura, Tokyo, all of Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/800,629

[22] Filed: Feb. 14, 1997

[30] Foreign Application Priority Data

Feb. 29, 1996 [JP] Japan ................................. 8-067519

[51] Int. Cl.⁶ ......................................................... H04N 5/445
[52] U.S. Cl. ........................... 348/569; 348/734; 345/327; 345/333; 345/352
[58] Field of Search ......................... ; 345/327, 333, 345/334, 335, 352, 353; 348/563, 564, 565, 566, 569, 570, 734, 725, 731, 468, 581; H04N 5/455, 5/445

[56] References Cited

U.S. PATENT DOCUMENTS

| | | | |
|---|---|---|---|
| 4,052,719 | 10/1977 | Hutt et al. ............................... | 348/468 |
| 4,218,698 | 8/1980 | Bart et al. ................................ | 348/589 |
| 5,287,514 | 2/1994 | Gram ....................................... | 345/333 |
| 5,689,665 | 11/1997 | Mitsui et al. ............................ | 345/333 |
| 5,781,193 | 7/1998 | Alimpich et al. ....................... | 345/352 |
| 5,781,247 | 7/1998 | Wehmeyer et al. .................... | 348/569 |
| 5,805,167 | 9/1998 | Van Cruyningen .................... | 345/353 |

FOREIGN PATENT DOCUMENTS

| | | | | |
|---|---|---|---|---|
| 4113785 | 4/1992 | Japan . | | |
| 4157990 | 5/1992 | Japan . | | |
| 0575945 | 3/1993 | Japan . | | |
| 0236370 | 9/1993 | Japan | ............................ | H04N 5/445 |
| 8186774 | 7/1996 | Japan | ............................ | H04N 5/445 |

*Primary Examiner*—David E. Harvey
*Attorney, Agent, or Firm*—Jay H. Maioli

[57] ABSTRACT

A main menu is displayed by operating a menu key, and "C. MENU" is selected to display a customized menu set screen, and "SELECT ITEM" is selected to display "SELECT ITEM" screen (S001–S003). Then, a sub-operation item, for example, "VIDEO MODE" is selected from a list for sub-operation items displayed on the screen by using a selection key and, further, a display order thereof is are selected. When there are plurality number of items desired by the user, selecting operation is conducted by repeating steps S004, S005 and S006 and, when selection for the items is completed, "SELECT ITEM" screen is ended (S007). The customized menu can be thus constructed by predetermined sub-operation items.

6 Claims, 8 Drawing Sheets

F I G. 7
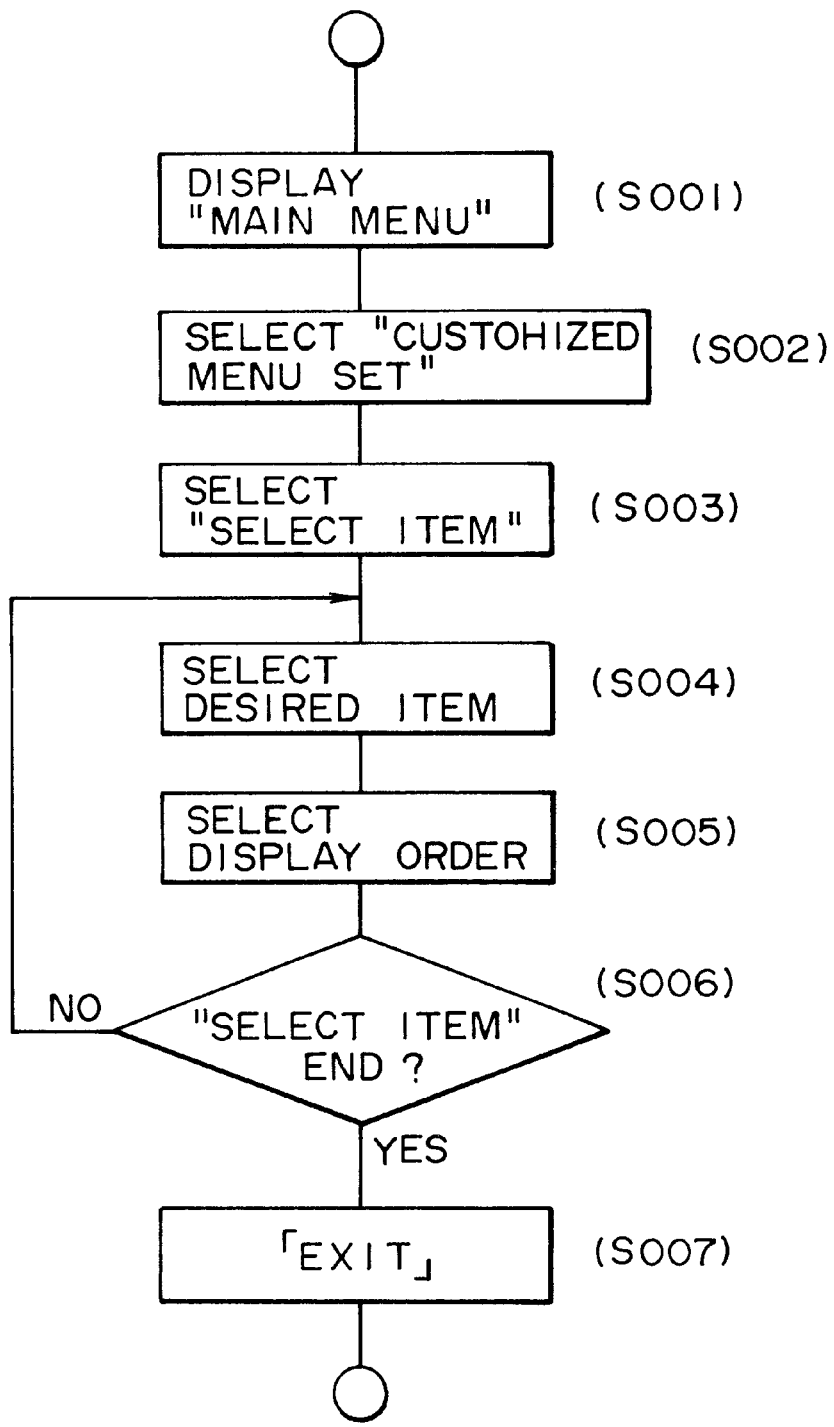

METHOD OF OPERATING MENU, ELECTRONIC EQUIPMENT AND TELEVISION RECEIVER SET

FIELD OF THE INVENTION

The present invention relates to a method of operating menus and of constructing a user's menu screen in accordance with operation items desired by a user, as well as an electronic equipment and a television receiver set.

BACKGROUND OF THE INVENTION

In recent years multi-functional constitutions have been introduced, for example, in television receiver sets popularized in homes, such that a user can control hue and tone in accordance with various conditions to enjoy received broadcasting by conducting various kinds of control/setting operations. However, if operation keys are disposed in accordance with each of the operation items described above, this complicates the constitution of operation means such as a remote commander for controlling/setting operations. It has been proposed that a menu screen designed as a hierarchical structure be displayed on a cathode ray tube (hereinafter simply referred to as CRT) for each controlling/setting item, and a user selects a desired item to conduct various kinds of controlling/setting operations by operating predetermined operation keys (menu key and the like) disposed, for example, on a remote commander while observing the menu screen.

FIG. 9 shows an example of an existent menu screen displayed on CRT for conducting various kinds of controlling/setting operations in a television receiver set and FIG. 10 is a view illustrating an example of a hierarchical structure of the menu screen.

For instance, when a television receiver set is in operation, when a user operates a key for menu screen display disposed, for example, a remote commander, a main menu screen 41 is displayed to a portion of a display area 40 of CRT. In this case, each of the main operation items such as "VIDEO", "AUDIO", "TIMER", "SET UP", "CAPTION VISION" and "EXIT" and a cursor C for selecting the menu operation items are displayed.

Then, the user moves the cursor C displayed at the top of each of the main operation items in a vertical direction by using, for example, a cursor moving key to select a desired main operation item, by which a sub-menu screen constituted with auxiliary operation items formed at a lower layer of the main operation item is displayed.

The sub-menu screen is constructed, for example, as shown schematically in FIG. 10. Sub-menu screens 42a, 42b, 42c, 42d and 42e are constructed, respectively, corresponding to the main operation items "VIDEO", "AUDIO", "TIMER", "SET UP" and "CAPTION VISION" displayed on the main menu screen 41. For example, when the main operation item "VIDEO" is selected on the main menu screen 41, the sub-menu screen 42a is displayed.

The sub-menu screen 42a is constituted with sub-operation items concerning "VIDEO", for example, "Picture", "Brightness" and "Hue" and is adapted such that various kinds of control can be conducted by selecting a desired sub-operation item in the same manner as for the main menu screen 41.

For example, if the sub-operation item "Picture" is selected on the sub-menu screen 42a, a control screen 43a constructed as a controlling screen to the lower layer of the sub-menu screen 42a is displayed. Then, the user can conduct the controlling operation with reference, for example, to a display of numerical values or levels displayed therein. Further, when the sub-operation item "Brightness" or "Hue" is selected on the sub-menu screen 42a, the control screen 42b or 43c is displayed.

While only the control screens 43a, 43b, 43c and 43d for the sub-menu screen 42a are shown in the drawing, similar control screens are disposed also concerning each of the sub-operation items of the sub-menu screens 42b, 42c, 42d and 42e respectively.

Further, when the main operation item "AUDIO", "TIMER", "SET UP" or "CAPTION VISION" on the main menu screen 41 is selected, the sub-menu screens 42b, 42c, 42d or 42e constructed with sub-operation items (not illustrated) are also displayed in accordance with the main operation items. Then, by selecting a desired sub-operation item, the user can move to a control screen not illustrated in this drawing to conduct each of the various controlling operations.

Although not illustrated, a sub-menu screen may be constructed by further sub-operation items to a lower layer of the sub-operation item depending on the operation item.

For improving ease of usability for conducting various kinds of control by selecting such a great number of control items, it may be considered to provide a menu screen display of good operability, for example, by displaying items other than the selected controlling/setting item by a halftone, as shown in Japanese Patent Laid-Open Hei 5-75945, changing the order of controlling items in accordance with the frequency of use, as shown, for example, in Japanese Patent Laid-Open Hei 4-157990 and Hei 4-157990, or by alternately selecting an ordinary display, as shown in Japanese Patent Laid-Open Hei 4-113785.

However, since the methods as described in each of the patent laid-open publications intends to improve usability by changing the display format of the menu screen, that is, displaying the items while rearranging them along a priority order, or displaying the not selected items with a halftone, all of controlling/setting items set by a manufacturer upon shipment are displayed, from which the user has to select a desired controlling/setting item.

Further, the structure of the menu screen in which a number of controlling items are constructed as a hierarchical structure as shown in FIG. 9 is also a ready made structure previously set by the manufacturer, which is not always convenient to use for all of user's. Namely, for conducting a certain control, there have been enforced complicate selecting operations of opening a main menu screen a sub-menu screen and a further sub-menu screen therebeneath.

Further, when a sub-operation item is controlled, for example, on the sub-menu screen 42a and, subsequently, a sub-operation item is controlled on the sub-menu screen 42c, there is a troublesome procedure that the user once returns to the main menu screen 41 to select the main operation item "TIMER" and then enters its hierarchical layers.

SUMMARY OF THE INVENTION

The present invention overcomes such problems and provides a method of operating a menu for displaying a main menu comprising a plurality of main operation items for conducting various kinds of controlling/setting operations by the operation of a menu key, and sub-menus constructed as lower layer menus to a main operation item and comprising one or plurality of sub-operation items in accordance with a selected main operation item when one of the main operation items is selected, wherein a user's menu screen is constructed by selecting a predetermined sub-operation item from all of the sub-operation items described above.

The present invention also provides an electronic equipment comprising display means for selectively displaying on a screen a main menu comprising a plurality of main operation items for conducting various kinds of controlling/setting operations, and sub-menus constructed as lower layer menus to the main operation items and comprising one or more sub-operation items in accordance with a selected main operation item when one of the main operation items is selected, and selection means for selecting a main operation item or a sub-operation item from the main menu or the sub-menu displayed on the screen and conducting various kinds of controlling/setting operations, wherein a user's menu screen is constructed by selecting a predetermined sub-operation item among the sub-operation items described above and the user's menu can be displayed on the screen by the display means.

The present invention further provides a television receiver set comprising display means for selectively displaying, on an image display section, a main menu comprising a plurality of main operation items for conducting various kinds of controlling/setting operations, and sub-menus constructed as lower layer menus to the main operation items and comprising one or more sub-operation items in accordance with a selected main operation item when one of the main operation items is selected, and selection means for selecting a main operation item or a sub-operation item from the main menu or the sub-menu displayed on the image display section and conducting various kinds of controlling/setting operations, wherein a user's menu screen is constructed by selecting a predetermined sub-operation item among the sub-operation items described above and the user's menu can be displayed on the image display section by the display means.

In accordance with the present invention, a user can construct a customized menu by selecting only the operation items conducted frequently by the user, separately from a menu screen of a hierarchical structure provided by a manufacturer. Accordingly, a desired controlling item can be called out instantly for various kinds of controlling by using the customized item, to improve the operability for each controlling item.

As has been described above according to the present invention, a menu screen suitable to the user's usability can be constructed separately from the menu of a hierarchical structure set by a manufacturer, by selecting only the desired items from a number of operation items. Accordingly, troublesome procedures for searching desired controlling/setting items from the hierarchical structure for conducting the controlling/setting operation, thereby enabling smooth controlling/setting operations to be conducted with a lesser number of operations.

BRIEF DESCRIPTION OF THE DRAWINGS

FIG. 7 is a flowchart illustrating the flow when an item of the customized menu is selected;

DESCRIPTION OF THE PREFERRED EMBODIMENTS

The present invention will be explained by way of preferred embodiments for a case in which the invention is applied to a television receiver set.

Figure 1:
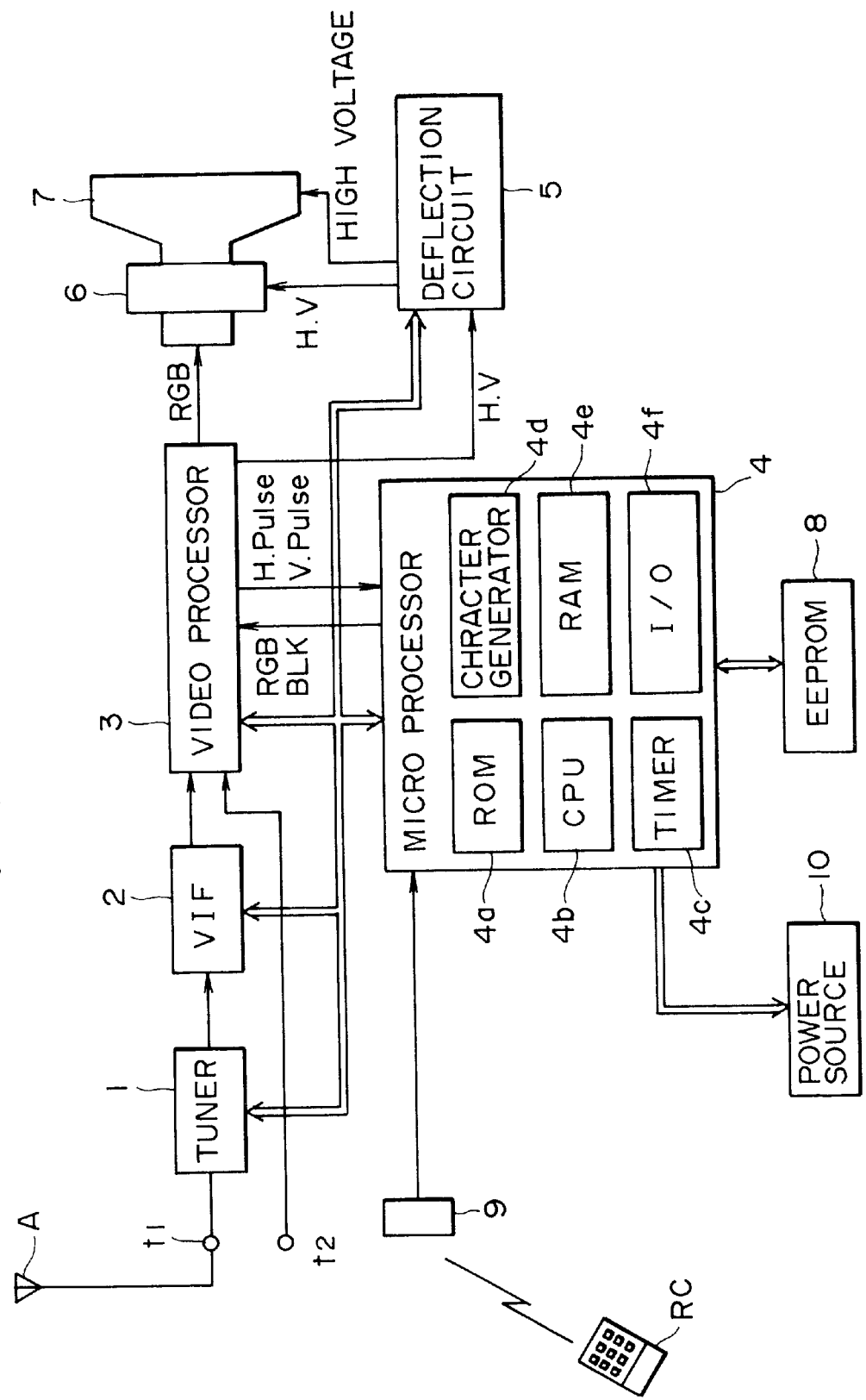
FIG. 1 is a block diagram for a circuit as a portion of a television receiver set in a preferred embodiment according to the present invention.

FIG. 1 is a block diagram illustrating a main portion of a video system in a television receiver set as a preferred embodiment of the present invention.

Broadcasting waves received by an antenna A are inputted by way of an input terminal t1 to a tuner 1 and selected. Further, selected television signals are amplified in an intermediate frequency amplifying section (VIF) 2 to intermediate video frequency signals of a predetermined level and supplied to a video processor 3.

The video processor 3 receives at its input video signals from the VIF 2 and external equipments, for example, a video deck (not illustrated) by an external input terminal t2, applies various kinds of video signal processings and supplies RBG signals to a CRT 7. Further, the video processor 3 supplies vertical sync pulse Vpulse and horizontal sync pulse Hpulse from the inputted video signals to a microprocessor 4. Further, the video processor 3 has an on-screen display function, and is adapted to output character signals generated by a character generator to be described later by superposing character signals on the inputted video signals.

The microprocessor 4 comprises a ROM (Read Only Memory) 4a for storing various kinds of initial setting items, a CPU (Central Processing Unit) 4b for controlling various kinds of function circuits of the television receiver set, a timer 4c used for prescription setting a character generator 4d for generating characters such as for a menu screen or a channel display to be displayed on the screen, a RAM (Random Access Memory) 4e used, for example, in a work area, for example, for various kinds of signal processings, and an interface (I/O) 4f for various kinds of function circuits.

RAM 4e stores a customized menu constructed by a user in order to facilitate usability for the user.

The character generator 4d supplies, to the video processor 3, R, G, B and blank BLK (colorless) signals each at a predetermined timing such that the corresponding information is displayed at a predetermined position on the display section of the CRT 7 in synchronization with the vertical sync pulse Vpulse and the horizontal sync pulse Hpulse supplied from the video processor 3. The video processor 3 superposes the character signals supplied from the character generator 4d at a predetermined timing onto video signals inputted from VIF 2 or the external input terminal t2 and supplies them to the CRT 7.

Thus, video images from a broadcasting channel or an external input equipment inputted from input terminals t1, t2 and selected currently, as well as information such as for channels selected currently and received voices (A mode, B mode, main/sub-voice) and a menu screen can be displayed. When the menu screen is displayed, it can also be adapted to display only the menu screen switching from the inputted video signals.

The deflection circuit 5 generates a vertical deflection signal V and a horizontal deflection signal H from the vertical sync pulse Vpulse and the horizontal sync pulse Hpulse supplied from the video processor 3 and supplies them to the deflection yoke 6 attached to the neck of the CRT 7. Further, it is adapted such that images at high brightness can be obtained by supplying a high voltage and high current to the anode of the CRT, for example, by stepping up a horizontal blanking pulse by a fly back transformer or the like.

The memory 8 is constituted, for example, with an EEPROM (Electrical Erasable and Progrmable Read Only Memory), in which a menu screen set by a manufacturer upon shipment (preset menu) is stored therein. That is, when a user conducts various kinds of controlling by the preset menu, character information is read out from the memory 8 and character signals are formed by the character generator.

The remote commander RC is an operation means for a user to conduct various kinds of operations including controlling/setting operations. A command inputted by the user is supplied using, for example, infrared rays as a carrier by way of a photoreceiving section 9 of the television receiver set main body to the microprocessor 4.

The power source section 10 supplies an operation power at AC 100 V from a commercial power source to each of the function circuits constituting the television receiver set as a preferred embodiment of the invention by way of a route not-illustrated.

Figure 2:
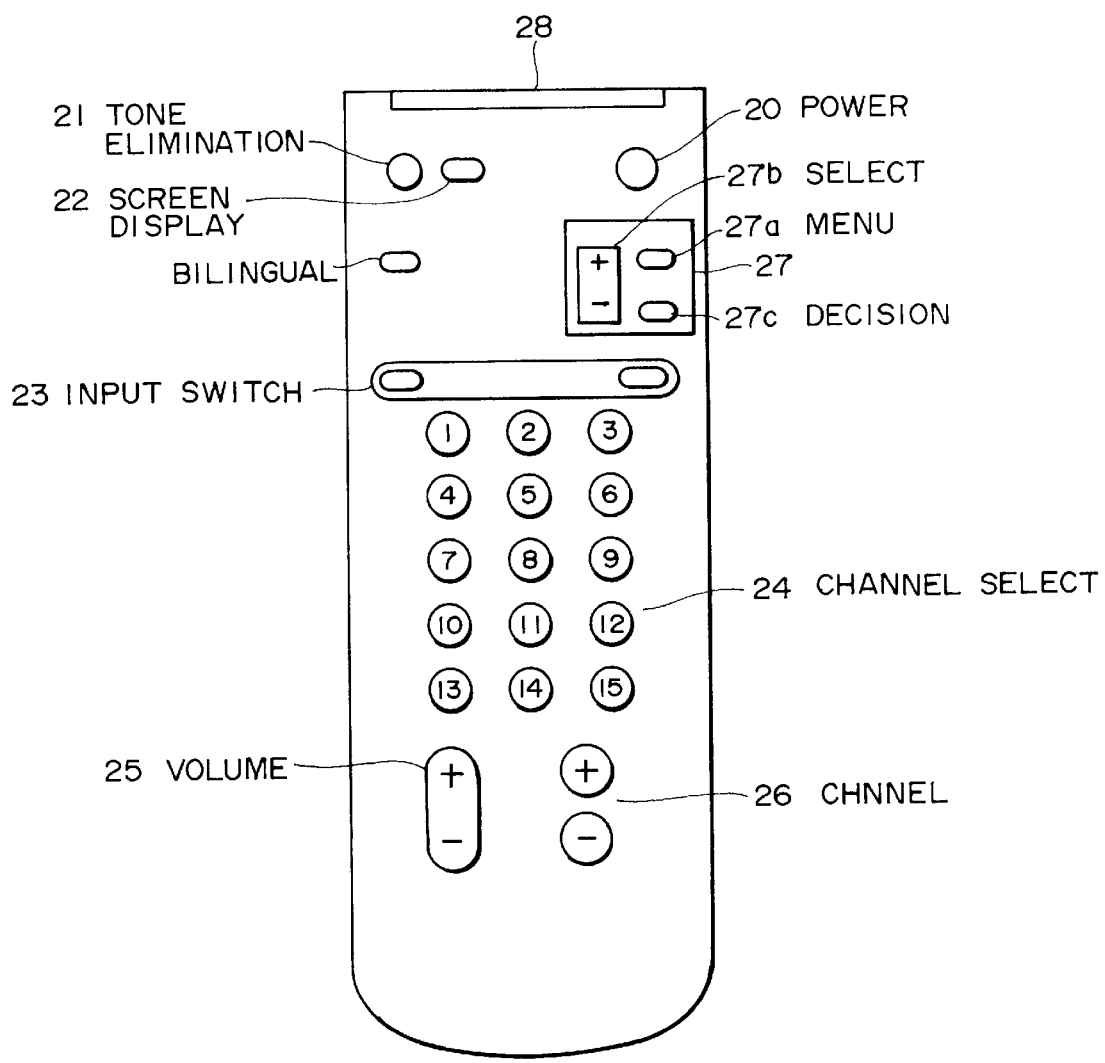
FIG. 2 is a view for explaining operation keys provided on a remote commander as operation means of a television receiver set in a preferred embodiment according to the present invention.

The remote commander RC has various kinds of operation keys provided thereon, for example, as shown in FIG. 2.

For example, there are provided a power source key 20 for supplying the power to the television receiver set main body, a voice elimination key 21 for eliminating voice, a screen display key for displaying a selection channel information or the like, an input switching key 23 for switching input, a channel selection key group 24 for directly selecting channels, a volume key 25 for controlling the volume of the voice, and a channel selection key 26 used for channel selection by up-down operation, as well as a menu operation key group 27 for conducting various controlling by the menu screen.

The menu operation key group 27 comprises, for example, a menu key 27*a* for displaying a menu screen, a selection key 27*b* for selecting the item displayed on the menu screen and conducting various kinds of controlling/ setting operations and a decision key 27*c* for deciding a controlled/set item regarding various kinds of the items. In the present invention, when a user sets a customized menu, the customized menu is displayed first by the operation of the menu key 27*a* as described later.

Then, when each of the operation keys is operated, a command in accordance with the operation (IR ray signal) is radiated from a light emitting section 28 and sent to be television receiver set main body.

Then, a customized menu that can be set by each of the users in the present invention will be explained in accordance with FIG. 3 to FIG. 6.

Figure 3A:
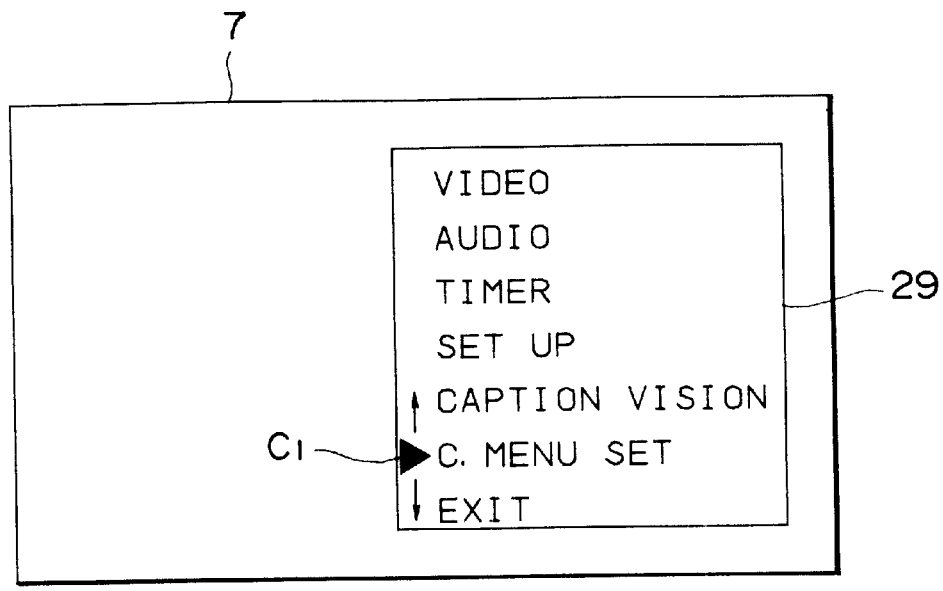
FIG. 3 is a view illustrating an example of a main menu screen and a customized menu set screen.
Figure 3B:
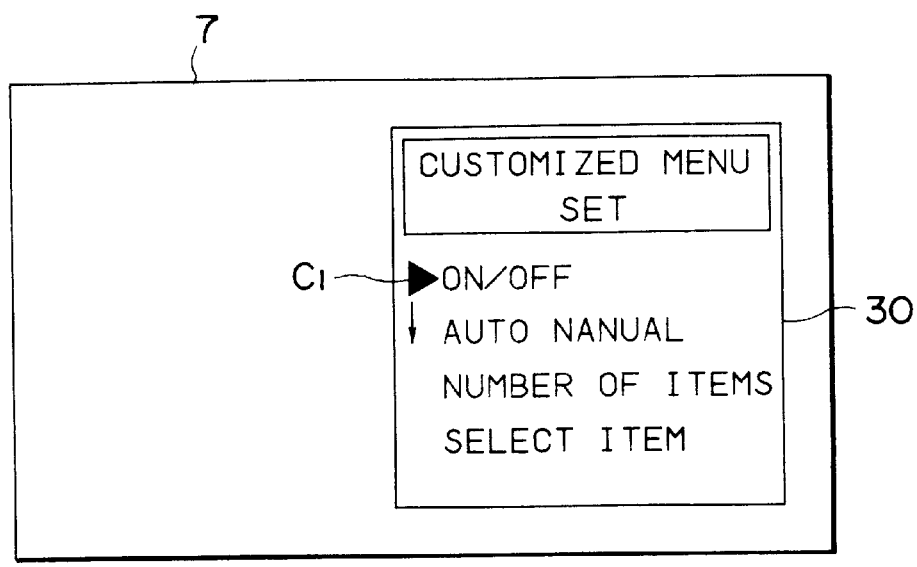

FIG. 3A is an example of a main menu screen displayed by the operation of the menu key 27*a* and FIG. 3B is a schematic view of one example of a set screen with a customized menu which can be selected on the main menu screen.

When the menu key 27*a* is operated in a state in which the customized menu is not yet set or the display is "OFF", a main menu screen 29 constructed by the main operation items, for example, "VIDEO", "AUDIO", "TIMER", "SET UP", "CAPTION VISION", "C.MENU SET" and "EXIT" is displayed. "C.MENU SET" disposed in the present invention is provided as a main operation item which is selected when a user sets the customized menu and when this item is selected, a set screen 30 of the customized menu constructed by sub-operation items shown, for example, in FIG. 3B is displayed.

In the set screen 30 "ON/OFF" is a sub-operation item for ON/OFF setting of the customized menu. When the customized menu is used, the customized menu is displayed by setting "ON" and operating the menu key 27*a* of the remote commander RC. When the customized menu is not used, the main menu screen 29 shown in FIG. 3A is displayed by setting to "OFF" and operating the menu key 27*a*.

"AUTO/MANUAL" is a sub-operation item for selecting whether the item displayed on the customized menu (hereinafter simply referred to as the ITEM) is set by user's manual selection, or set by automatic selection in accordance with the frequency of the operation item selected by the user.

"NUMBERS OF ITEMS" is a sub-operation item for setting the number of items displayed on the customized menu, and the number of items displayed may be increased or set to a required minimum number in accordance, for example, with easy usability by the user.

"SELECT ITEM" is a sub-operation item which is set by the user's manual section for the item displayed on the customized menu. When this item is selected, a list for all the sub-operation items that construct the sub-menu screen is displayed, and the user can construct a customized menu of convenient usability by selecting desired sub-operation items with reference to the list.

Further, when all of the settings have been completed, the main menu screen is ended by the selection of "EXIT" and only the usual video images are displayed on the CRT 7.

Description will be made to an example of constructing a customized menu by selecting "SELECT ITEM" in accordance with FIG. 4 and FIG. 5.

Figure 4A:
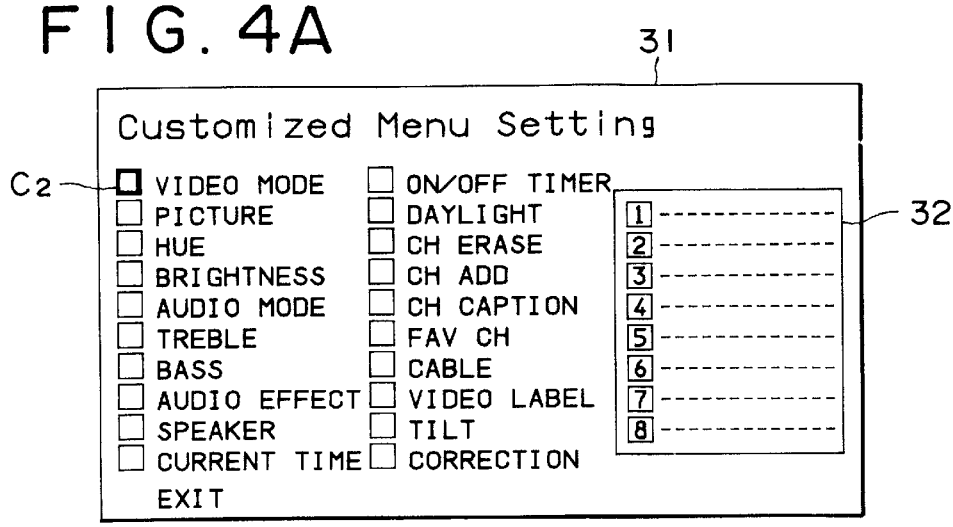
FIG. 4 is an explanatory view for when an item in the customized menu is selected by "SELECT ITEM" screen which is a sub-menu screen for the customized menu set screen.

When the sub-operation item "SELECT ITEM" explained with reference to FIG. 3B is selected, "SELECT ITEM" screen 31 shown in FIG. 4A is displayed. As shown in the drawing, all of the sub-operation items such as "VIDEO MODE", "PICTURE", "HUE" - - - "CORRECTION" are displayed as a list to the left in the screen. If there are a great number of sub-operation items, they may be displayed, for example, by dividing them in a plurality of pages. Further, the sub-operation item now under selection is shown by a cursor $C_2$ indicated, for example, at the top of "VIDEO MODE" by a bold frame line. The cursor $C_2$ can move along the head for each of the sub-operation items by operating the selection key 27*b* of the remote commander RC.

Further, when the cursor $C_2$ is moved to the head of "EXIT" and the selection key 27*b* is operated, "SELECT ITEM" screen 31 is ended.

To the right of the list for the sub-operation items, a selection area 32 is disposed for displaying sub-operation items selected by the user as the items of the customized menu. In this embodiment, eight sub-operation items from "1" to "8" can be set for instance. That is, each of the items of the customized menu is displayed in the order shown in the selection area 32.

Figure 4B:
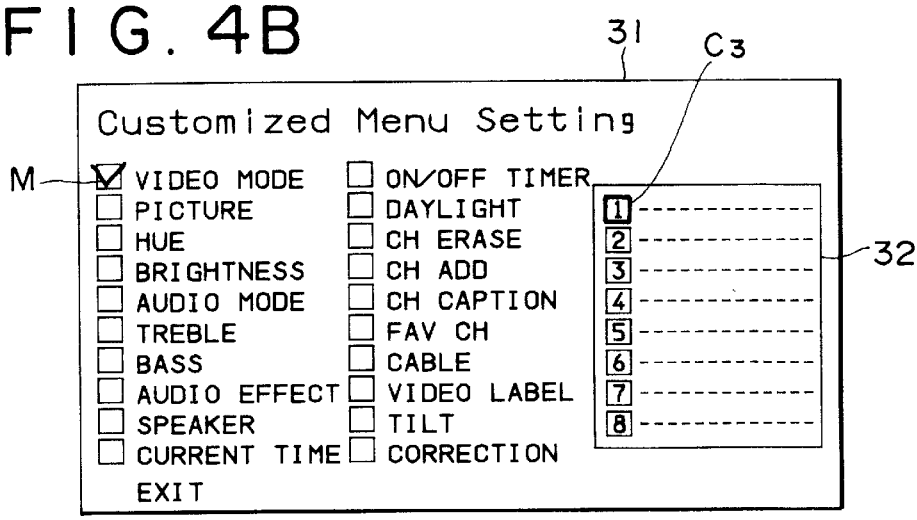

In FIG. 4A, when the cursor C₂ is moved to the head of "VIDEO MODE" by the selection key 27b and the decision key 27c is operated, "VIDEO MODE" is selected. In this case, mark M is displayed at the head of "VIDEO MODE" (for the selection) is displayed as shown in FIG. 4B and, at the same time, a cursor C₃ surrounded with bold fat frame line is displayed, for example, at the head of "1" in the selection area 32.

Figure 4C:
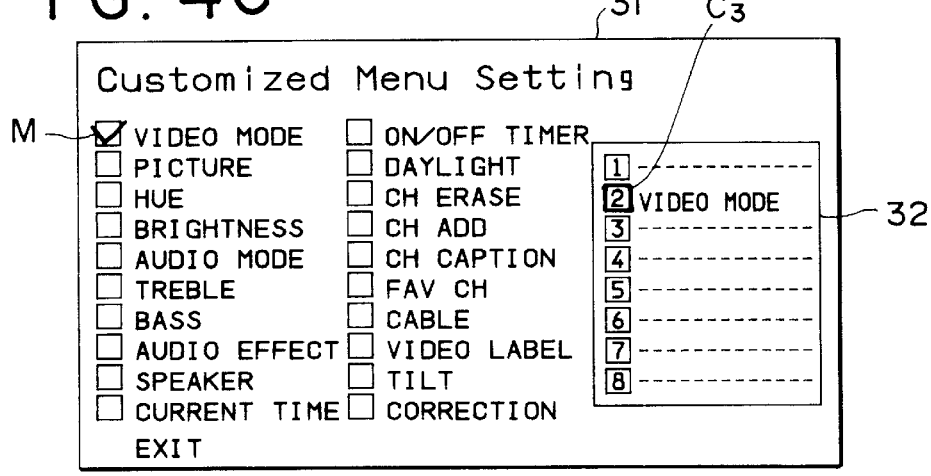

Then, the user operates the selection key 27b to select the sequential position for the "VIDEO MODE" to be displayed on the customized menu. Then, when "VIDEO MODE" is displayed, for example, at the second position from above, the cursor C₃ is moved to a position for "2" and the decision key 27c is operated. Then, "VIDEO MODE" is displayed at the position "2" as shown in FIG. 4C and "VIDEO MODE" is displayed at the second position from above in the customized menu.

Figure 5:
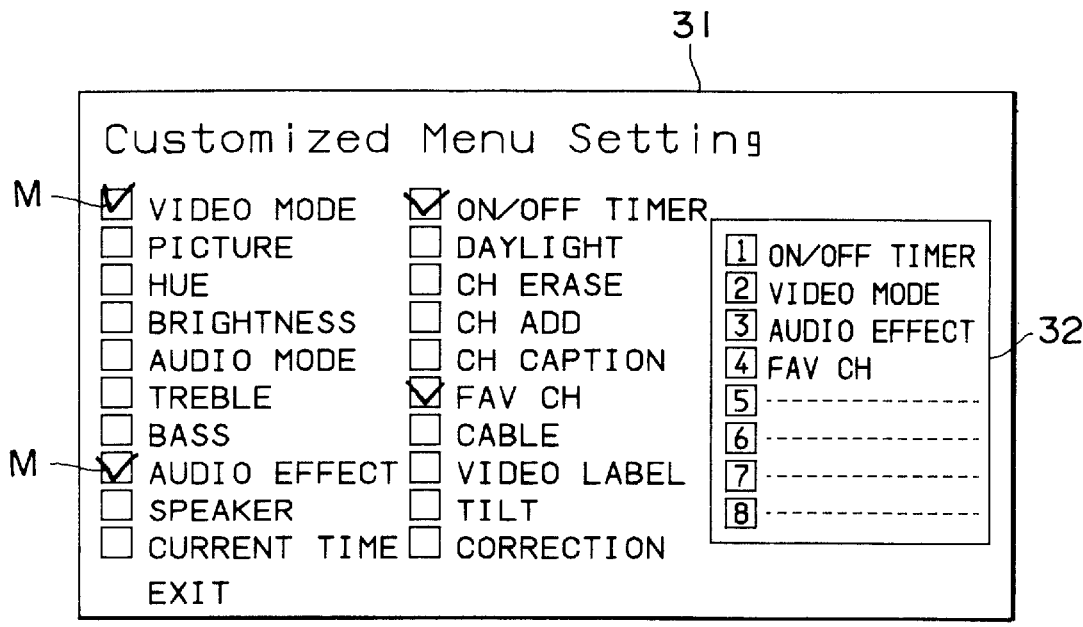
FIG. 5 is a view illustrating a state of selecting items is "SELECT ITEM" screen.

In the same procedures, when items are selected such that "AUDIO EFFECT" is at the third position, "ON/OFF TIMER" is at the first position and "FAV CH" is at the fourth position for instance, selected sub-operation items are displayed, for example, as shown in FIG. 5, by the display of marks M, M, - - - and the selection area 32.

Figure 6:
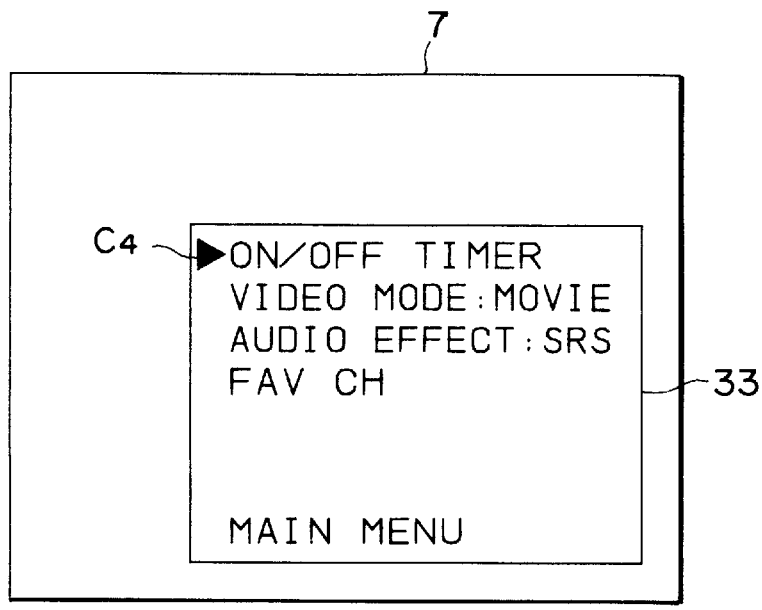
FIG. 6 is a view illustrating an example of the customized menu screen.

As described above, when the sub-operation items intended to be displayed on the customized menu are selected and, further, the customized menu display is set to "ON", a customized menu 33, for example, as shown in FIG. 6 is displayed in the display area of the CRT 7.

Also in the customized menu 33, the cursor C4 is moved and the displayed item is selected by operating the selection key 27b. Since only the items desired by the user, displayed, operations, for example, display of the main menu screen and selection of the main operation item can be saved. Further, procedures for searching desired sub-operation items from the hierarchical structure can be saved to improve the operability.

Further, "MAIN MENU" is an item set for selecting the main menu screen 29 from the customized menu 33. For example, when a sub-operation item not displayed on the customized menu 33 is controlled, it is possible to select and control the desired sub-operation items from the main menu screen 29 by selecting "MAIN MENU".

Then, descriptions will be made to a flow in a case of selecting a sub-operation items desired by the user in customized menu set screen 30 in accordance with a flowchart shown in FIG. 7. It is assumed that "AUTO/MANUAL" is set to "MANUAL".

At first, the menu key 27a is operated to display the main menu screen 29 (S001). In this case, when several items have already been set in the customized menu 33, the main menu screen 29 is displayed from the customized menu 33. Then, "C. MENU" is selected to display the customized menu set screen 30 (S002) and, further, "SELECT ITEM" is selected to display "SELECT ITEM" screen 31 (S003).

When "SELECT ITEM" screen 31 is displayed, a desired sub-operation item, for example, "VIDEO MODE" is selected from the list for the sub-operation items displayed on the screen by using the selection key 27b (S004), and further the order of display for the selected sub-operation item is selected in the selected area 32 (S005). When there are plurality number of items desired by the user (S006), selective operation is conducted by repeating steps S004, S005 and S006.

Then, when the selection for the desired item is ended (S006), "EXIT" is selected to end "SELECT ITEM" screen 31 (S007).

In this way, when the user manually selects the items, the customized menu 33 in which the items in accordance with the setting are arranged in the setting order is displayed. Further, a customized menu 33 in accordance with user's usability can be constructed by newly adding/eliminating items.

Figure 8:
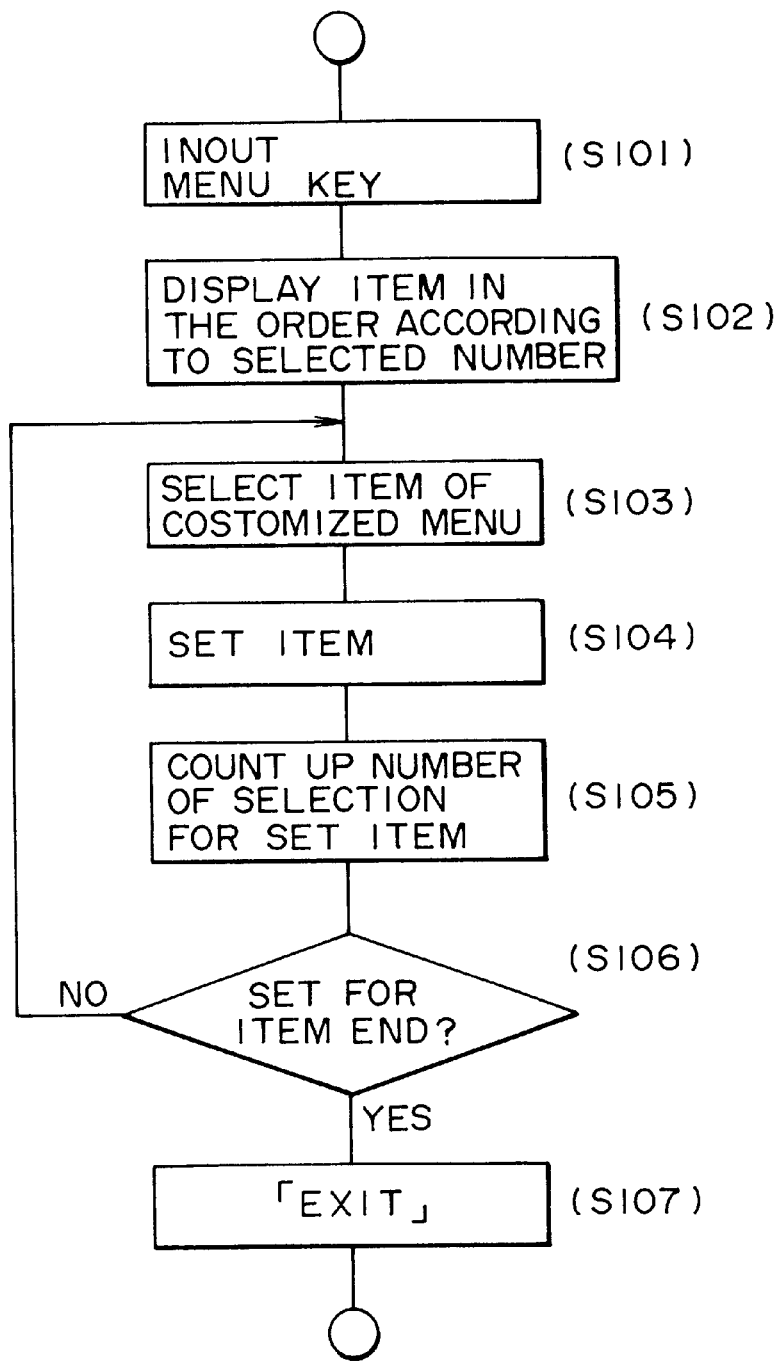
FIG. 8 is a flowchart illustrating the flow when the items displayed in the customized menu are arranged in the order of higher frequency of use.
Figure 9:
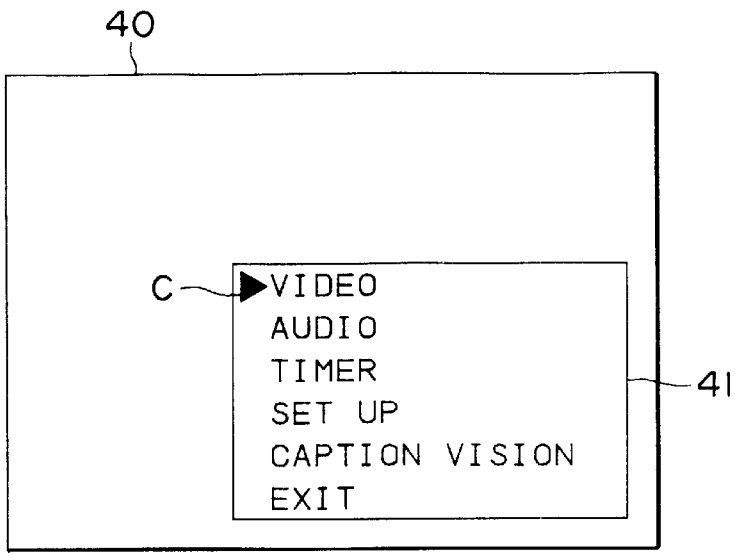
FIG. 9 is a view illustrating an example of an existent main menu screen.
Figure 10:
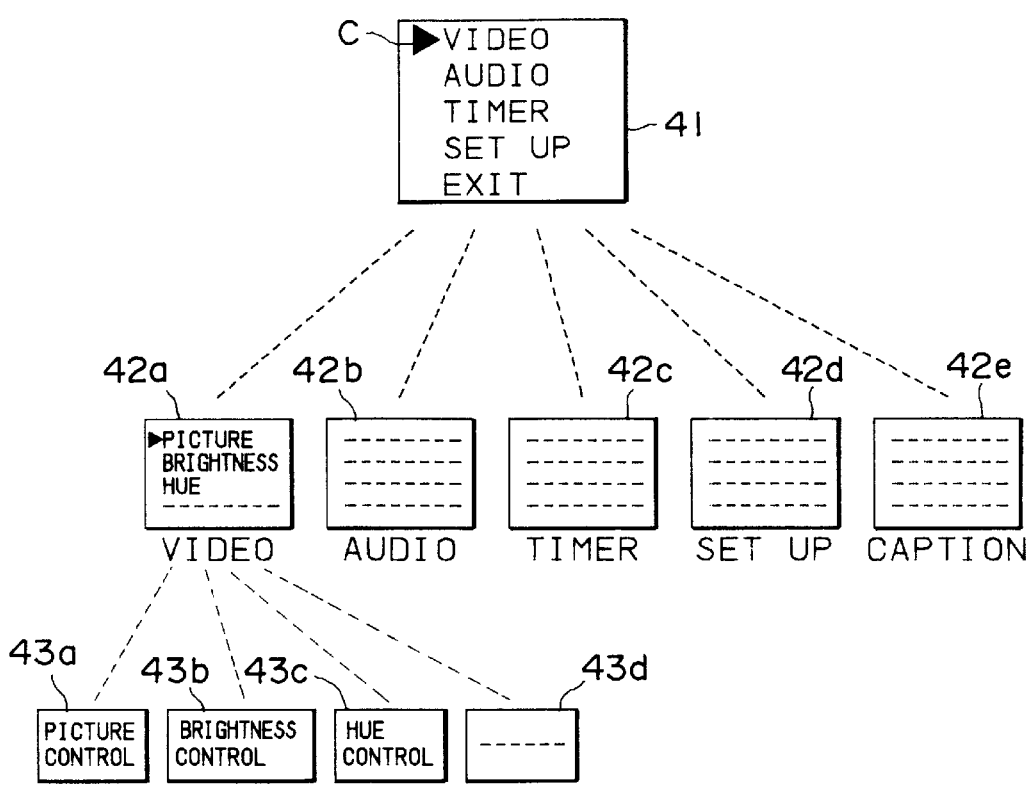
FIG. 10 is a view illustrating an example of a hierarchical structure of the existent menu screen.

Then, description is to be made to an example of constructing a customized menu 33 in the order, for example, in accordance with the frequency of use for the sub-operation items actually controlled by the user (AUTO mode) in accordance with the flowchart shown in FIG. 8. In this embodiment, description is to be made assuming that several items have already been set to the customized menu 33 by the user.

At first, the customized menu 33 is displayed by operating the menu key 27a (S101). In this case, each of the items is displayed in the order set by the user at the initial stage. In the AUTO MODE, items are displayed in the order of items with greater number of selection (S102). Then, the item displayed on the customized menu 33 is selected (S103) to conduct various controlling/setting (S104), and the number of selections for the controlled/set items is counted up (S105). The number of selection is written, for example, into the RAM 4e of the microprocessor. When controlling/setting is further continued (S106), steps (S103), (S104), (S105) are repeated, and "EXIT" is selected at the end of controlling/setting, to end the customized menu 33.

With the procedures described above, since the counted value is increased for the item with higher using frequency and the items are displayed successively from the upper row of the customized menu, the moving operation of the cursor C₂ by using the selection key 27b can be minimized to improve the operability.

Further, the order of the items displayed on the customized menu are automatically rearranged, for example, depending on the frequency of use in the embodiment shown in FIG. 8, but it is also possible to count the number of controlling/setting for all of the sub-operation items which can be selected from the main menu screen 29, and extract and display the sub-operation item of high using frequency on the customized menu.

What is claimed is:

1. A method of operating a menu, comprising steps of:

displaying on a screen a main menu comprising a plurality of main operation items for conducting various controlling/setting operations by operating a menu key;

displaying on said screen sub-menus constructed as lower layer menus relating to respective ones of said plurality of main operation items, wherein each of said sub-menus comprises a plurality of sub-operation items in accordance with a selected main operation item;

selecting a user-set number of sub-operation items to be included in a customized user's menu;

constructing said customized user's menu by selecting a plurality of sub-operation items from said sub-menus, said plurality of sub-operation items totalling a maximum number corresponding to said user-set number, wherein when an item of said plurality of sub-operation items is selected by a user said user determines a numerical display position on said customized user's menu for said item; and displaying on said screen said customized user's menu superimposed on a video image.

2. A method of operating a menu as defined in claim 1, wherein said sub-operating items in said customized user's menu are selected and arranged automatically in order of higher frequency of use.

3. An electronic equipment comprising:

display means for selectively displaying on a screen a main menu comprising a plurality of main operation items for conducting various kinds of controlling/setting operations and sub-menus constructed as lower layer menus relating to respective ones of said main operation items, wherein each of said sub-menus comprises a plurality of sub-operation items in accordance with a selected main operation item; and selection means for selecting a main operation item and a sub-operation item from said main menu and a sub-menu, respectively, when said main menu and said sub-menu are displayed on said screen in order to conduct various controlling/setting operations, said selection means including means for selecting a user-set number of sub-operation items for a customized user's menu, wherein said customized user's menu is constructed by selecting a plurality of sub-operation items from said sub-menus, said plurality of sub-operation items totalling a maximum number corresponding to said user-set number, when an item of said plurality of sub-operation items is selected by a user, said user inputs to said selection means a numerical display position on said customized user's menu for said item, and said customized user's menu is displayed on said screen by said display means.

4. An electronic equipment as defined in claim 3, wherein said sub-operation items in said customized user's menu are selected and arranged automatically in order of higher frequency of use.

5. A television receiver set comprising:

display means for selectively displaying on an image display section a main menu comprising a plurality of main operation items for conducting various controlling/setting operations and sub-menus constructed as lower layer menus relating to respective ones of said main operation items, wherein each of said sub-menus comprises a plurality of sub-operation items in accordance with a selected main operation item; and selection means for selecting a main operation item and a sub-operation item from said main menu and a sub-menu, respectively, when said main menu and said sub-menu are displayed on said image display section in order to conduct various controlling/setting operations, said selection means including means for selecting a user-set number of sub-operation items for a customized user's menu, wherein said customized user's menu is constructed by selecting a plurality of sub-operation items from said sub-menus, said plurality of sub-operation items totalling a maximum number corresponding to said user-set number, when an item of said plurality of sub-operation items is selected by a user, said user inputs to said selection means a numerical display position on said customized user's menu for said item, and said customized user's menu is displayed on said image display section by said display means.

6. A television receiver set as defined in claim 5, wherein said sub-operation items in said customized user's menu screen are selected and arranged automatically in order of higher frequency of use.

* * * * *